(12) United States Patent
Durand

(10) Patent No.: US 12,523,155 B2
(45) Date of Patent: Jan. 13, 2026

(54) MOVING BLADE FOR A TURBINE OF A TURBINE ENGINE, COMPRISING A STILT EQUIPPED WITH PROJECTIONS FOR RADIALLY RETAINING THE BLADE

(71) Applicant: SAFRAN AIRCRAFT ENGINES, Paris (FR)

(72) Inventor: Yannick Durand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/691,496

(22) PCT Filed: Sep. 13, 2022

(86) PCT No.: PCT/FR2022/051722
§ 371 (c)(1),
(2) Date: Mar. 13, 2024

(87) PCT Pub. No.: WO2023/041868
PCT Pub. Date: Mar. 23, 2023

(65) Prior Publication Data
US 2024/0376829 A1 Nov. 14, 2024

(30) Foreign Application Priority Data
Sep. 14, 2021 (FR) ........................................ 2109631

(51) Int. Cl.
*F01D 5/30* (2006.01)
(52) U.S. Cl.
CPC ........ *F01D 5/3007* (2013.01); *F05D 2240/80* (2013.01); *F05D 2250/11* (2013.01); *F05D 2250/21* (2013.01)

(58) Field of Classification Search
CPC ...... F01D 5/3007; F01D 5/3015; F01D 5/323; F01D 5/326; F05D 2240/80; F05D 2250/11; F05D 2250/21
See application file for complete search history.

(56) References Cited

U.S. PATENT DOCUMENTS 7,198,467 B2 * 4/2007 Keith ........................ B22C 9/04
416/193 A
2008/0273982 A1 11/2008 Chunduru
(Continued)

FOREIGN PATENT DOCUMENTS

EP 0068923 A1 1/1983
FR 2954797 A1 7/2011
(Continued)

OTHER PUBLICATIONS

English machine translation of FR 3092612-A1, Aug. 21, 2024.*
(Continued)

*Primary Examiner* — Christopher Verdier
(74) *Attorney, Agent, or Firm* — McDonald Hopkins LLC

(57) ABSTRACT

A blade for a turbine rotor wheel of an aircraft turbomachine, successively comprising a blade root, a stilt, a platform, as well as a vane, the blade root being intended to be housed in a blade housing groove provided on a peripheral portion of a turbine disc, the housing groove being defined between two directly consecutive disc teeth. According to the invention, on each of the two sides thereof, in the circumferential direction of the blade, the stilt is provided with a protrusion for radially retaining the blade, each protrusion comprising a stop surface which is radially inwardly directed and intended to cooperate with a radially outer surface of a disc tooth.

8 Claims, 5 Drawing Sheets

(56) References Cited

U.S. PATENT DOCUMENTS

2016/0146016 A1\* 5/2016 Johns ............... F01D 5/081
                                                                              416/1
2023/0025087 A1\* 1/2023 Ueda ............... F01D 5/005

FOREIGN PATENT DOCUMENTS

FR       02972759 A1 \* 9/2012
FR        3092612 A1    8/2020

OTHER PUBLICATIONS

English machine translation of FR 2972759-A1, Aug. 21, 2024.\*
Search Report for International Application No. PCT/FR20022/051722 dated Dec. 7, 2022.
Written Opinion for International Application No. PCT/FR20022/051722 dated Dec. 7, 2022.

\* cited by examiner

MOVING BLADE FOR A TURBINE OF A TURBINE ENGINE, COMPRISING A STILT EQUIPPED WITH PROJECTIONS FOR RADIALLY RETAINING THE BLADE

CROSS REFERENCE TO RELATED APPLICATIONS

This is a National Stage application of PCT international application PCT/FR2022/051722, filed on Sep. 13, 2022, which claims the priority of French Patent Application No. FR 2109631, filed Sep. 14, 2021.

TECHNICAL FIELD

The invention relates to the field of the turbine rotor blades for a turbomachine, preferably for an aircraft turbomachine. It relates more particularly to the means implemented to ensure the radial retention of the blades relative to the turbine disk, in order to prevent, at the stop or under the effect of gravity, some blades from being displaced towards the wheel axis too consistently.

The invention applies to any type of turbomachine, such as for example a turbojet engine or a turboprop engine.

STATE OF THE PRIOR ART

In an aircraft turbomachine, the turbine rotor wheels are generally made using a disc, on the periphery of which, turbine blades are mounted. The gas flow path is delimited radially inwardly by platforms provided on the blades, in the vicinity of the roots thereof.

The blades have already been the subject of numerous developments, and an example of design is for example known from the document FR 2 954 797 A1.

In operation, it is known to radially hold each rotor blade using the root thereof, by housing it in a groove in the periphery of the turbine disk. To do this, the root is generally equipped with two circumferentially opposite bearing surfaces, respectively bearing against the two teeth of the peripheral portion of the disc which delimit the groove receiving the root therebetween. Thanks to these supports resulting from the centrifugal force, each blade is in a first configuration of radial retention by the root thereof, preventing it from escaping radially outwardly relative to the turbine disk.

When the turbomachine is not in operation, that is to say when the rotor is stationary, the rotor blades of the upper portion of the blade ring can fall under the effect of gravity, that is to say be displaced towards the axis of the wheel. In the absence of means for stopping this radially inward displacement, each concerned blade can see the root come into abutment in the bottom of the groove of the periphery of the disk. If it is too significant, this radial displacement of the blade can prove to be problematic in that it is likely to lead to a circumferential misalignment of the blade heads, with the possible consequence of a detrimental overlapping of these heads during the next operation of the turbomachine.

In order to avoid this risk, it is known to provide two ridge arranged on either side of the blade stilt, in the axial direction thereof. Each ridge originates from the platform and extends radially inwardly until close proximity to the teeth of the peripheral portion of the disc.

If these low ridges are satisfactory in that they allow limiting the radial displacement of certain blades when the turbine engine is stopped, they nevertheless constitute a solution substantially penalising the overall mass of the blade.

SUMMARY OF THE INVENTION

In order to at least partially overcome the drawback mentioned above, the subject of the invention is first of all a turbine rotor wheel of a turbomachine.

According to the invention, on each of the two sides thereof, in the circumferential direction, the stilt is provided with a protrusion for radially retaining the blade, each protrusion comprising a stop surface which is radially inwardly directed and intended to cooperate with a radially outer surface of a disc tooth.

With the solution proposed by the present invention, the inward radial retention of the blade is advantageously carried out using simple protrusions equipping the stilt. These protrusions remain simple to produce, reliable, and contribute to limiting the overall mass of the blade in comparison with the ridge solutions known from the prior art.

Furthermore, the mass reduction generated by the implementation of the protrusions, associated with the removal of all or part of the ridges on the blade, leads to a reduction in the mechanical stresses being exerted on the operating blade root. This also allows limiting the sizing of the blade root, as well as that of the teeth of the peripheral portion of the turbine disc.

The invention preferably comprises at least any one of the following optional features, taken in isolation or in combination.

Preferably, each protrusion for radially retaining the blade has a shape which narrows by being circumferentially spaced from the stilt, for example a general triangular shape. Other shapes are nevertheless possible, such as a bead shape, without departing from the scope of the invention.

Preferably, each protrusion for radially retaining the blade extends over all or part of the axial length of the stilt.

Preferably, each of the first and second cavities is also partially delimited, in an axial direction of the blade, by first and second connecting walls, the blade also comprising an upstream spoiler as well as a downstream spoiler, both separated from the platform in the direction of the height, the first connecting wall connecting the upstream spoiler to an upstream axial end of the platform, and the second wall connecting the downstream spoiler to a downstream axial end of the platform, each protrusion for radially retaining the blade being arranged radially between the upstream and downstream spoilers, and the blade root.

Preferably, the blade further includes first and second stiffening walls extending respectively from the upstream spoiler and the downstream spoiler, in the direction of the blade root, the first and second stiffening walls also each participating in delimiting the first and second cavities, and each protrusion for radially retaining the blade is arranged radially between the stiffening walls and the blade root.

Preferably, in a first configuration of radial retention of the blade by the root thereof, radially inwardly relative to the turbine disc, each stop surface defines a clearance with the radially outer surface of the associated disc tooth thereof, the clearance being for example comprised between 0.10 and 0.15 mm.

Preferably, in a second configuration of radial retention of the blade by the protrusions, radially outwardly relative to the turbine disc, each stop surface defines, with the radially outer surface of the associated disk tooth thereof, a contact area extending over a circumferential length which is for example greater than or equal to 1 mm.

The invention also relates to a turbomachine turbine comprising at least one rotor wheel as described above, the turbine preferably being a low-pressure turbine, but which may alternatively be a high pressure turbine.

Finally, the subject the invention also relates to an aircraft turbomachine comprising at least such a turbine, the turbomachine preferably being a bypass and twin-spool turbojet engine.

Other advantages and features of the invention will appear in the non-limiting detailed description below.

BRIEF DESCRIPTION OF THE DRAWINGS

This description will be made relative to the appended drawings, from which.

DETAILED DISCLOSURE OF EMBODIMENTS

Figure 1:
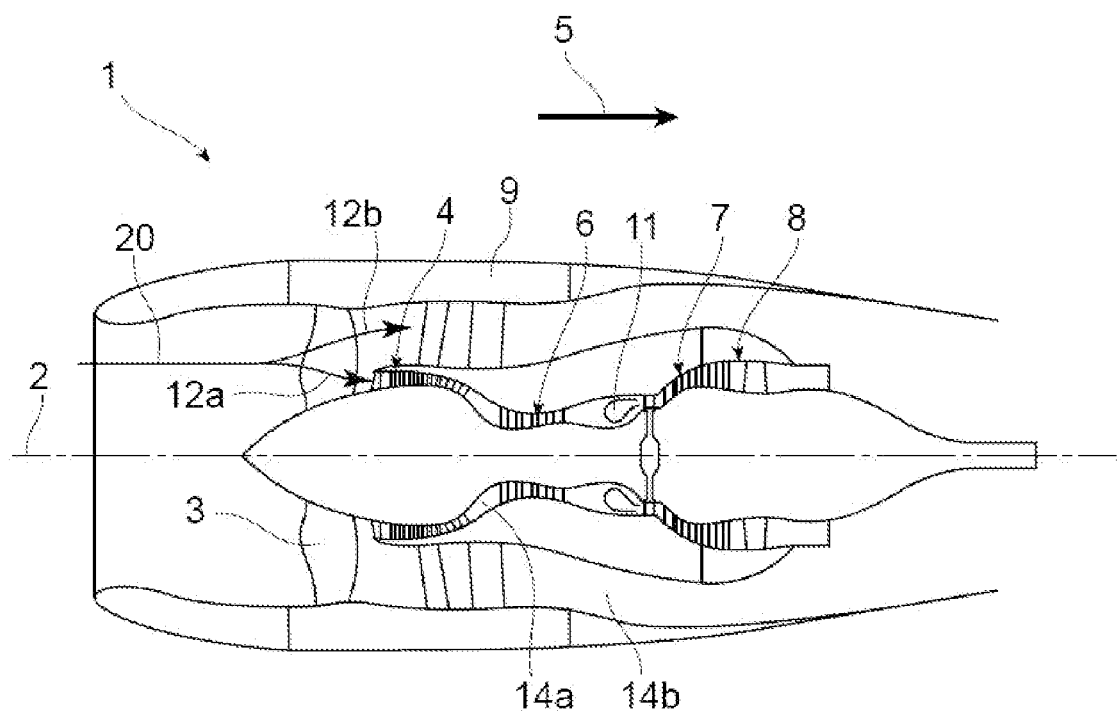
FIG. 1 represents a schematic view in axial section of a bypass turbojet engine according to the invention.

With reference first of all to FIG. 1, there is represented an aircraft turbomachine 1, according to a preferred embodiment of the invention. This is herein a bypass and twin-spool turbojet engine. Nevertheless, it could be a turbomachine of another type, for example a turboprop engine, without departing from the scope of the invention.

The turbomachine 1 has a longitudinal axis 2 about which the different components thereof extend. It comprises, from upstream to downstream along a main direction 5 of gas flow through this turbomachine, a fan 3, a low pressure compressor 4, a high pressure compressor 6, a combustion chamber 11, a high pressure turbine 7 and a low pressure turbine 8.

Conventionally, after passing through the fan, the air is divided into a central primary stream 12a and a secondary stream 12b which surrounds the primary stream. The primary stream 12a flows in a main flow path 14a for circulating gases passing through the compressors 4, 6, the combustion chamber 11 and the turbines 7, 8. The secondary stream 12b flows for its part in a secondary flow path 14b delimited radially outwardly by a motor casing, surrounded by a nacelle 9.

Figure 2:
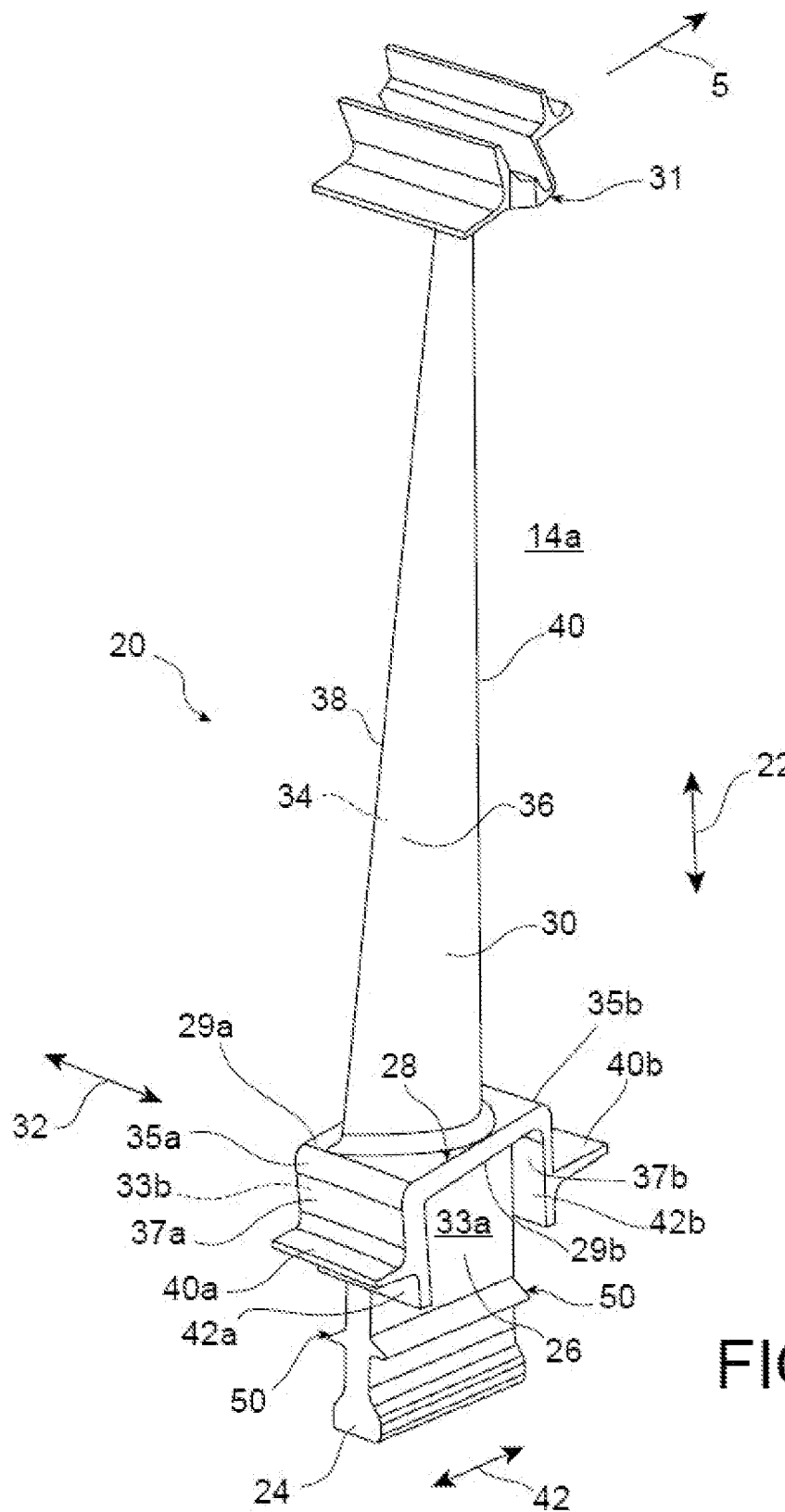
FIG. 2 represents a perspective view of a turbine rotor wheel of the turbojet engine shown in FIG. 1, and being in the form of a preferred embodiment of the invention.
Figure 3:
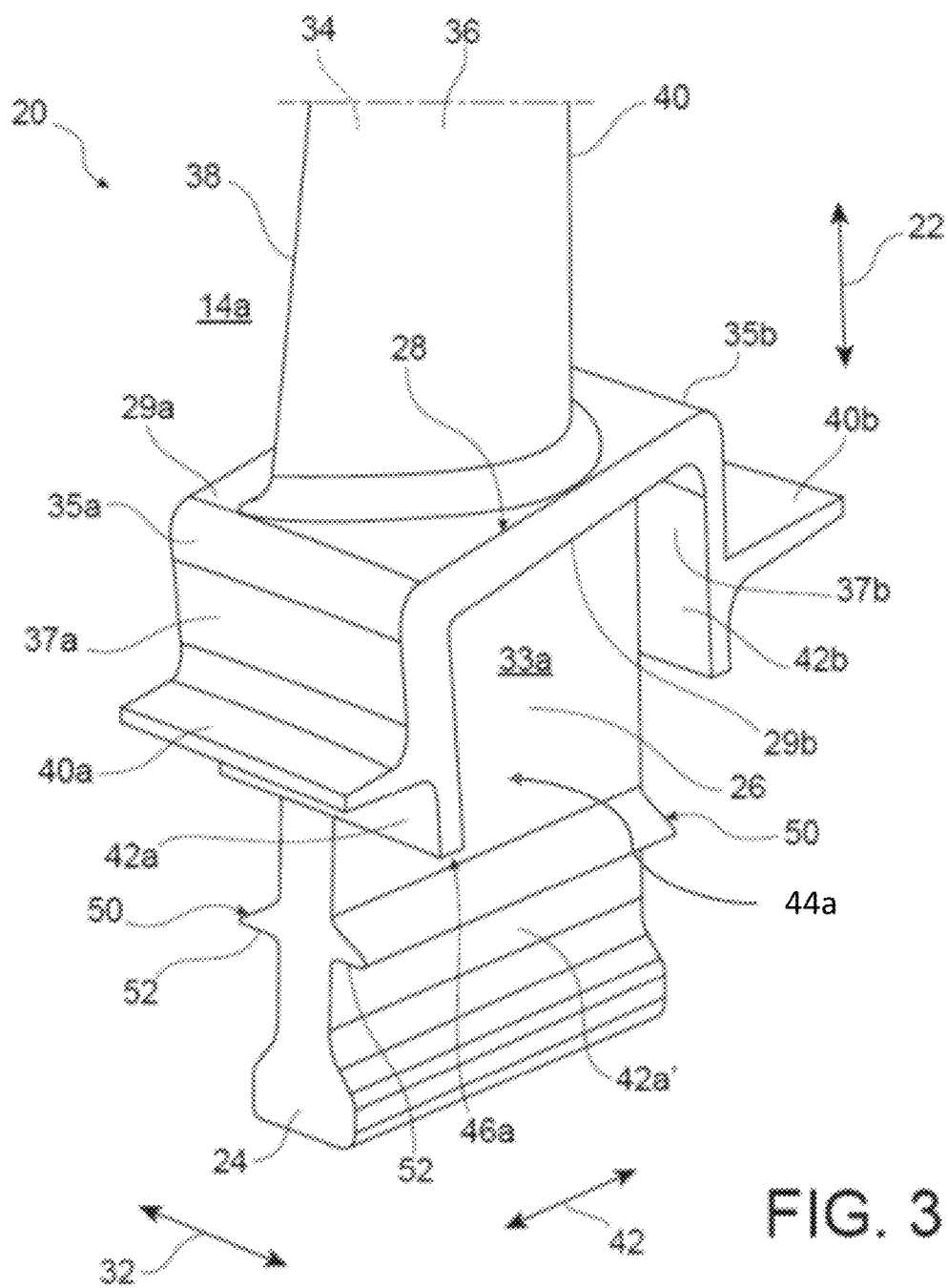
FIG. 3 represents a partial and enlarged perspective view of the blade shown in the preceding Figure.

FIGS. 2 and 3 represent a rotor blade 20 according to a preferred embodiment of the invention, this blade 20 being intended to equip a rotor wheel of any one of the turbines 7 and 8, and in particular the turbine low pressure 8. The mobile wheel is, conventionally, centred on the axis 2.

The elements of the blade 20 will be presented in the order such as they appear successively according to the direction of the height 22 of this blade, from bottom to top, or even from the inside to the outside since this direction of the height 22 also corresponds to the radial direction of the blade and of the turbine rotor wheel in which this blade is intended to be integrated.

Conventionally, the blade 20 comprises a blade root 24, a stilt 26, a platform 28, a blade 30 constituting the aerodynamic portion of the blade, and possibly a head structure 31 comprising another platform.

The blade root 24 adopts an outer shape called "fir tree" or "bulb" external shape, allowing it to be inserted into a corresponding blade housing groove of a turbine disk intended to carry the rotor blades. The stilt 26 usually has a small thickness along a circumferential direction 32 of the blade and the wheel, while the platform 28 also extends on either side of the stilt 26 along this same circumferential direction. 32.

More specifically, the platform 28 can extend circumferentially beyond the intrados 34 and the extrados 36 of the blade 30, and can also extend beyond a leading edge 38 and a trailing edge 40 of the blade, in an axial direction 42 of the blade and the wheel in which this blade is intended to be integrated.

With the outer surface 29a thereof, called first surface from which the blade 30 extends in the direction 22, the platform 28 delimits radially inwardly the main gas flow path 14a.

With the inner surface 29b thereof, called second surface which is opposite to the first surface 29a in the direction 22, and from which the stilt 26 extends in this same direction substantially in the extension of the vane 30, the platform 28 delimits radially outwardly a first cavity 33a as well as a second cavity 33b, arranged on either side of the stilt 26 in the direction 32.

The platform 28 includes an upstream axial end 35a, as well as a downstream axial end 35b. A first connecting wall 37a extends from the upstream end of the platform, radially inwardly and parallel or substantially parallel to the directions 22, 32, up to an upstream spoiler 40a protruding axially upstream. Similarly, a second connecting wall 37b extends from the downstream axial end 35b of the platform, radially inwardly and parallel or substantially parallel to the directions 22, 32, to an upstream spoiler 40b protruding axially upstream.

The first connecting wall 37a partially delimits, axially upstream, each of the two cavities 33a, 33b provided under the platform 28. Similarly, the second connecting wall 37b also partially delimits, axially towards the downstream, each of these two cavities 33a, 33b.

The spoilers 40a, 40b are thus offset radially inwardly relative to the platform 28, by being closer to the root 24. A connecting radius is preferably provided at the junction between each spoiler 40a, 40b and the associated connecting wall 37a, 37b thereof, and the same applies between each of these walls 37a, 37b and the platform 28.

From the upstream spoiler 40a, a first stiffening wall 42a may be provided extending radially inwardly and parallel or substantially parallel to the directions 22, 32, over a limited height. The inner edge of this first stiffening wall 42a is located at a large radial distance from the root 24, and therefore only covers axially a radially outer portion of the stilt 26.

Similarly, from the downstream spoiler 40b, there may be provided a second stiffening wall 42b extending radially inwardly and parallel or substantially parallel to the directions 22, 32, also over a limited height.

The stiffening walls 42a, 42b, also called "ridges", can be located respectively in the radial extensions of the connecting walls 37a, 37b, or else be slightly axially offset therefrom, as represented in FIGS. 2 and 3.

The first stiffening wall 42a partially delimits, axially upstream, each of the two cavities 33a, 33b provided under the platform 28, just as the second stiffening wall 42b also partially delimits, axially towards the downstream, each of these two cavities 33a, 33b.

The first cavity 33a remains open circumferentially in the direction opposite to the stilt 26, while it also remains open radially in the direction opposite to the platform 28. In the circumferential direction 32, the first cavity 33a is thus open at a first circumferential opening 44a referenced in FIG. 3. This first opening 44a is delimited by a first area 46a of junction with the second cavity 33b of a directly consecutive blade on the wheel, as known to the person skilled in the art. The first junction area 46a is at a lower circumferential end of the blade, and has the general shape of an inverted U, which is open radially inwardly.

One of the features of the invention resides in the absence of the first and second stiffening walls 42a, 42b under the spoilers, or else in the fact that they are maintained but at a low height, so as to considerably reduce their weight. In the exposed portion of the stilt 26, which is not covered axially by the elements 37a, 42a, 37b, 42b, another feature of the invention consists in providing that on each of the two sides thereof in the circumferential direction 32, this stilt 26 is provided with a protrusion 50 for radially retaining the blade.

Each of the two protrusions 50 comprises a stop surface 52 which is radially inwardly directed, and intended to cooperate with a radially outer surface of one of the two disc teeth defining the groove in which the root 24 of the concerned blade is housed, as will be described later.

In this preferred embodiment, each protrusion 50 for radially retaining the blade has a shape which narrows by being circumferentially spaced from the stilt 26, by adopting a generally triangular or bead shape. Each protrusion 50 is preferably made in one piece with the stilt, by extending over a limited circumferential length, which is strictly less than that of the aforementioned elements 37a, 37b, 40a, 40b, 42a, 42b, and for example identical or similar to that of the circumferential length of the most extended portion of the root 24 in the direction 32. It also extends over an axial length corresponding for example to the entire axial length of the stilt 26, as has been represented in FIGS. 2 and 3. Alternatively, each protrusion 50 could extend only over a portion of the axial length of the stilt 26, for example by being formed by axial segments which are axially spaced from each other.

Each radial retaining protrusion 50 is arranged radially between, on the one hand, the radially inner edges of the stiffening walls 42a, 42b, and, on the other hand, the upper portion of the blade root 24, while remaining at a radial distance of each of these elements 42a, 42b, 24. Furthermore, each radial retaining protrusion 50 extends axially between the stiffening walls 42a, 42b, therefore also between the spoilers 40a, 40b.

Figure 4:
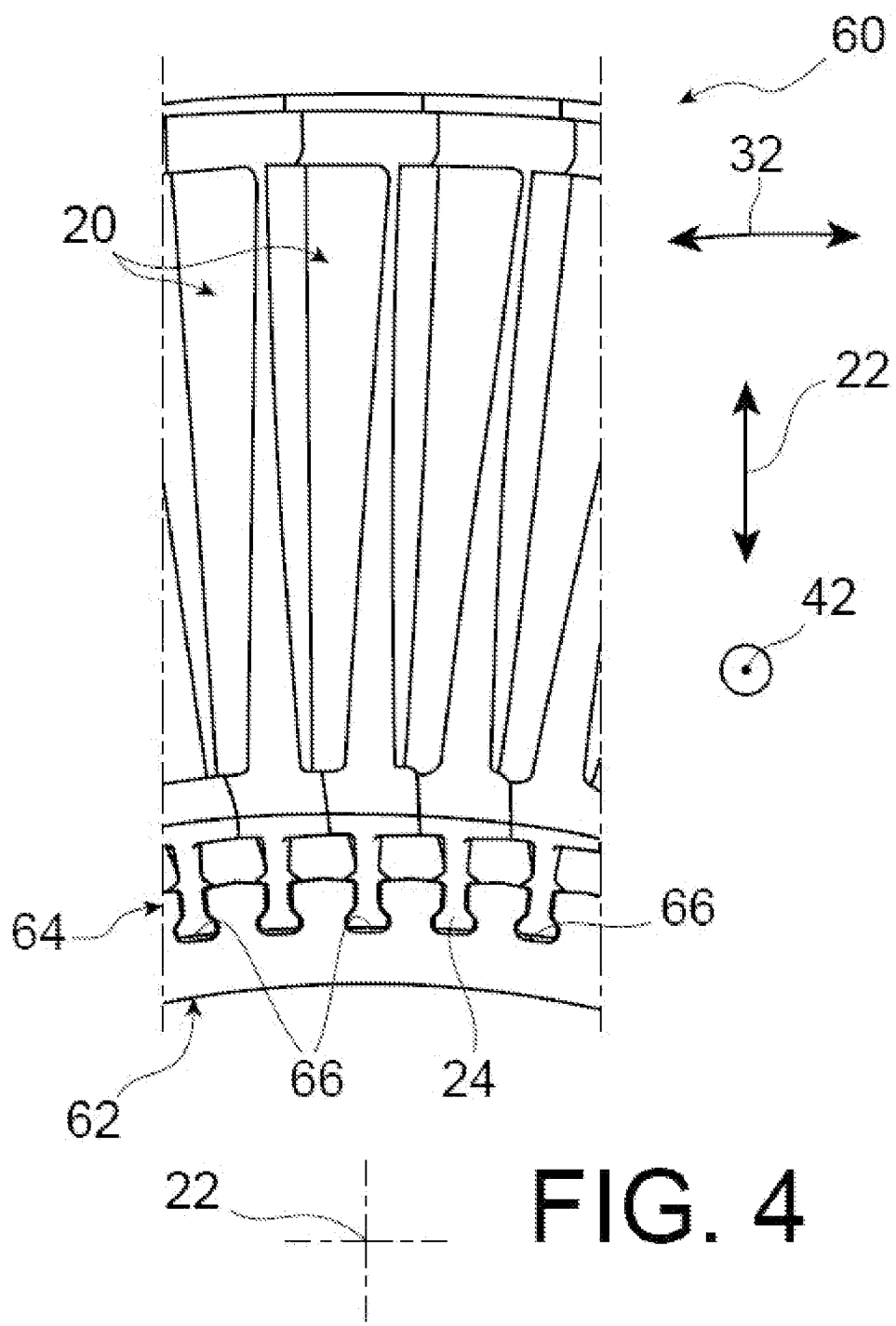
FIG. 4 represents a front view of portion of a turbine rotor wheel, comprising blades such as those shown in FIGS. 2 and 3.

FIG. 4 shows a portion of a turbine rotor wheel 60, comprising a disk 62 which is centred on the axis 2 and equipped with a peripheral portion 64 provided with axial grooves 66 for housing the blades 20. The axial grooves 66 succeed each other in the circumferential direction 32.

The wheel 60 also comprises a blade 20 of the type of that described above, with the root 24 of each blade being housed in one of the grooves 66 of the peripheral portion 64 of the disk.

Figure 5:
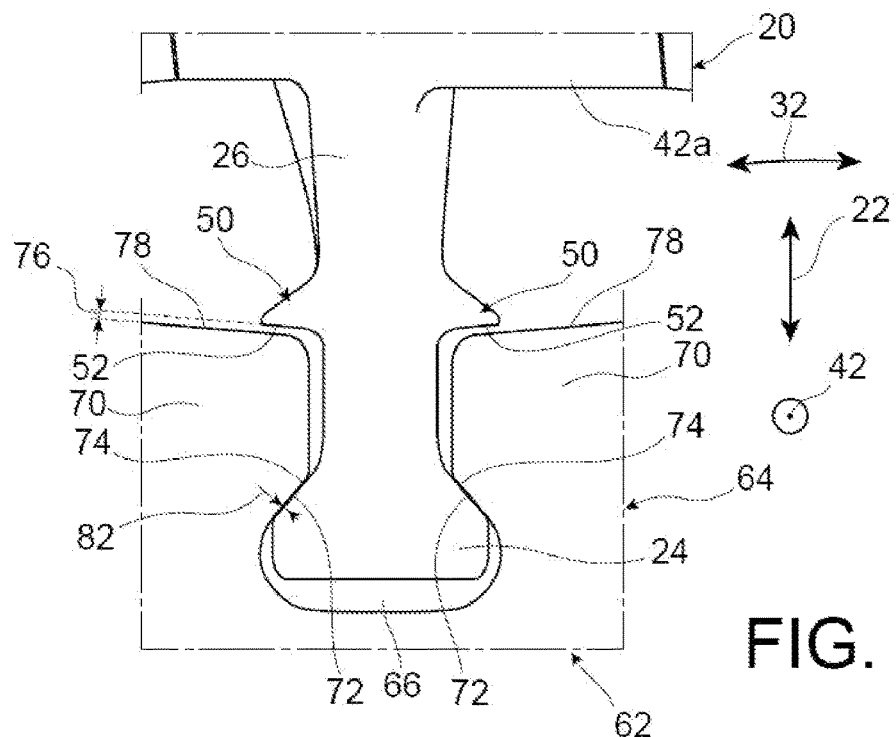
FIG. 5 is a further enlarged front view of portion of the wheel shown in FIG. 4, with one of the blades of the wheel represented in a first configuration of radial retention by the root thereof.

In FIG. 5, the blade 20 is represented in a first radial retaining configuration of radial retention by the root 24 thereof, this configuration being observed in operation when the centrifugal force causes the blade root 24 to be radially pressed against an inner surface 72 of teeth 70. These teeth 70 are those which form the peripheral portion 64 of the disc, by extending radially outwardly and defining therebetween, in the direction 32, the grooves 66 for housing the blade roots.

Thus, the blade root 24 is equipped with two circumferentially opposite bearing surfaces 74 which, in operation, bear respectively against the two surfaces 72 of two teeth which are directly consecutive in the direction 32, and which delimit therebetween the axial groove 66 receiving this root. Thanks to these supports resulting from the centrifugal force, each blade is in the first configuration of radial retention by the root 24 thereof, preventing it from escaping radially outwardly relative to the turbine disk 62. The blade 20 is designed such that in this first radial retaining configuration, a small radial clearance 76 remains between the stop surface 52 of each protrusion 50, and the radially outer surface 78 of the associated disc tooth 70 thereof which it faces. This clearance 76 is preferably comprised between 0.10 and 0.15 mm.

Figure 6:
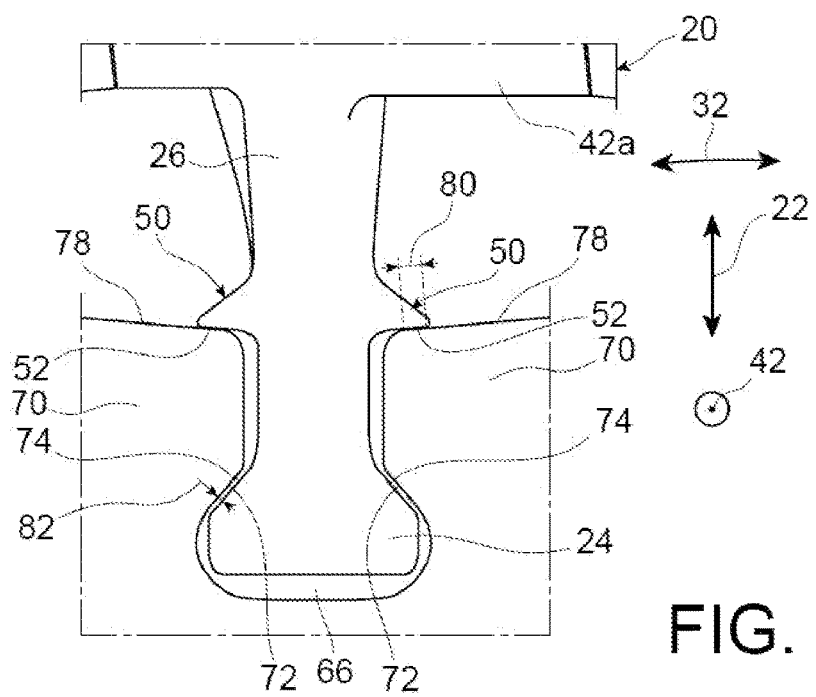
FIG. 6 is a front view similar to that of FIG. 5, with the same blade represented in a second configuration of radial retention by the protrusions equipping the stilt of this blade.

In FIG. 6, the blade 20 is represented in a second configuration of radial retention by its protrusions 50. This second configuration is observed when the turbomachine is not in operation, that is to say when it is stopped, and that the blades 20 of the upper portion of the blade ring can fall under the effect of gravity, and approach the axis of the wheel. This displacement is limited to the consumption of the radial clearance 76, described with reference to FIG. 5. Once this clearance 76 has been consumed and the protrusions 50 have come into contact with the two teeth 70, each stop surface 52 defines, with the radially outer surface 78 of the associated disc tooth 70 thereof, a contact area/interface extending over a circumferential length 80 greater than or equal to 1 mm. This also leads the bearing surfaces 74 of the blade root 24 to be radially offset from the inner surfaces 72 of the teeth 70, leaving a small clearance 82 to appear therebetween.

Of course, various modifications can be made by the person skilled in the art to the invention which has just been described, solely by way of non-limiting examples, and whose scope is defined by the appended claims.

What is claimed is:

1. A turbine rotor wheel of an aircraft turbomachine, comprising a turbine disc including a peripheral portion provided with grooves for housing blades, the grooves succeeding each other in a circumferential direction of the wheel, said wheel also comprising a plurality of the blades, a root of each respective blade being housed in a respective one of the grooves of the peripheral portion of the disc, each blade comprising successively, in a radial direction of a height of the blade relative to an axis of the wheel, the blade root, a stilt, a platform, as well as a vane, the blade root configured to be housed in the respective blade housing groove provided on the peripheral portion of the turbine disc of the rotor wheel, said housing groove being defined between two disc teeth which are directly consecutive in the circumferential direction about the axis, the platform comprising a first surface as well as a second surface which is opposite to the first surface in the radial direction, the first surface, from which the vane extends, configured to delimit a gas flow path, and the second surface, from which the stilt extends, partially delimiting a first and a second cavity arranged on either side of the stilt in the circumferential direction, wherein at each of the two sides thereof, in the circumferential direction, the stilt is provided with a protrusion for radially retaining the blade, each protrusion comprising a stop surface which is radially inwardly directed and configured to cooperate with a radially outer surface of one of the disc teeth, wherein each protrusion is positioned between a radially inner edge of one of a first and a second stiffening wall and the blade root of the respective blade, and wherein each stop surface defines a clearance with the radially outer surface of the associated disc tooth thereof, such that the protrusions do not contact the disc teeth in operation of the turbine rotor wheel.

2. The turbine rotor wheel according to claim 1, wherein the stop surface contacts the radially outer surface of the associated disc tooth thereof when the turbomachine is not in operation and the clearance is defined when the turbomachine is in operation due to a centrifugal force.

3. The turbine rotor wheel of claim 1, wherein each of the first and second cavities is also partially delimited, in an axial direction of the blade, by first and second connecting walls, wherein the blade also comprises an upstream spoiler as well as a downstream spoiler, both separated from the platform in the radial direction, the first connecting wall connecting the upstream spoiler to an upstream axial end of the platform, and the second wall connecting the downstream spoiler to a downstream axial end of the platform, each protrusion for radially retaining the blade being arranged radially between the upstream and downstream spoilers, and the blade root, and wherein the first and second stiffening walls extend radially respectively from the upstream spoiler and the downstream spoiler, in a direction of the blade root, the first and second stiffening walls also each participating in delimiting the first and second cavities.

4. The turbine rotor wheel according to claim 1, wherein each protrusion for radially retaining the blade has a shape which narrows by being circumferentially spaced from the stilt.

5. The turbine rotor wheel according to claim 1, wherein each protrusion for radially retaining the blade extends over an axial length of the stilt.

6. The turbine rotor wheel according to claim 1, wherein each stop surface is configured to define, with the radially outer surface of the associated disc tooth thereof, a contact area extending over a circumferential length when the turbine rotor wheel is not in operation.

7. A turbine comprising at least one rotor wheel according to claim 1, the turbine being a low-pressure turbine.

8. An aircraft turbomachine comprising at least one turbine according to claim 7, the turbomachine being a bypass turbojet engine.

* * * * *